June 13, 1961  W. C. McDONELL  2,987,911
GAS METER CALIBRATION APPARATUS
Filed Jan. 25, 1960
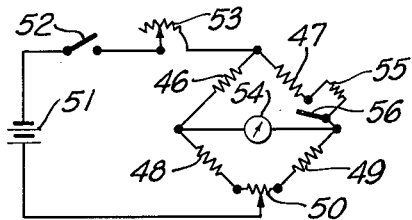
FIG. 4.
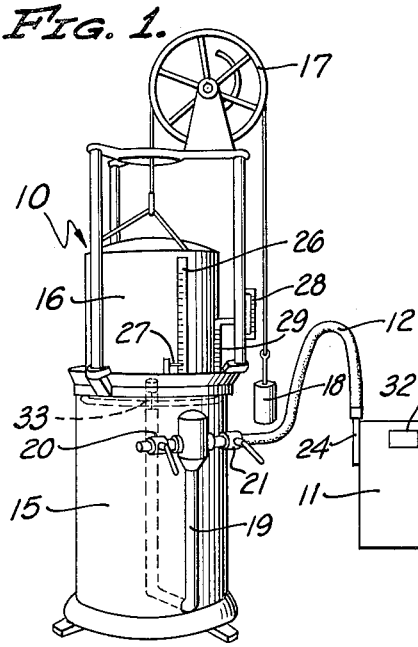
FIG. 1.
FIG. 2.
FIG. 3
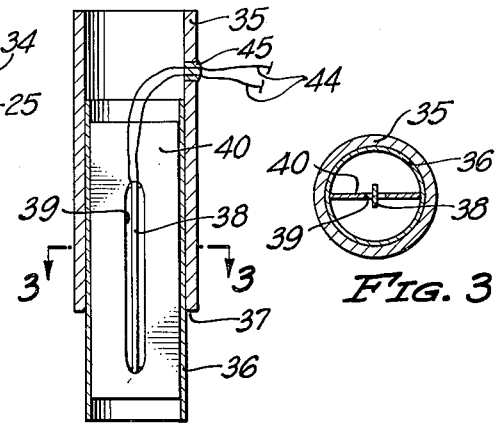
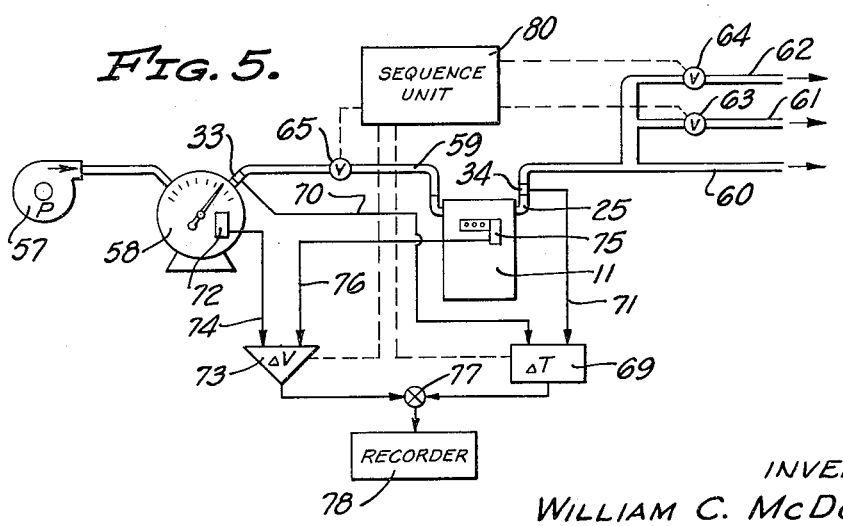
FIG. 5.
INVENTOR
WILLIAM C. McDONELL
BY HIS ATTORNEYS
HARRIS, KIECH, RUSSELL & KERN

United States Patent Office

2,987,911
Patented June 13, 1961

2,987,911
GAS METER CALIBRATION APPARATUS
William C. McDonell, La Habra, Calif.
(11036–A Aqua Vista St., North Hollywood, Calif.)
Filed Jan. 25, 1960, Ser. No. 4,367
7 Claims. (Cl. 73—3)

This invention relates to apparatus for calibrating flow meters such as positive displacement meters of the types used in measuring fuel gas supplied to residences and industrial establishments.

In the conventional calibration technique, a source of a known volume of gas, such as a prover or a blower and standard meter, is connected to the meter under test. A quantity of gas is passed from the source through the meter to exhaust and the meter reading is compared with the volume indication of the source to provide a correction for the meter. Variations in temperature at the source and at the meter introduce errors into the calibration technique and standard practices call for the source and the meter or meters to be maintained in a temperature controlled room for a number of hours in order to obtain some degree of temperature equilibrium. However, these standard techniques have some drawbacks and disadvantages. It is difficult and expensive to maintain temperature equilibrium of one or two degrees F. throughout a large workroom. The soaking time required for the temperature of the meters to change in order to reach equilibrium with the workroom causes a considerable delay in the calibration operation, particularly during seasons of extremes of weather conditions. Even when all these technical problems are overcome, the difference of a degree or two in the temperature of the source and of the meter will introduce errors in the calibration. Gas leaving the source will ordinarily be at the temperature of the source and the standard calibration practices presume that the gas remains at this temperature throughout the calibration run. However, the large thermal mass of a typical gas meter will provide considerable heat for transfer to the gas passing therethrough and will change the temperature of the gas to that of the meter.

It is an object of the present invention to provide an apparatus for calibrating gas flow meters without requiring expensive temperature regulation or conditioning or storing of the meters prior to calibration. A further object is to provide such apparatus which produces more accurate calibration than conventional equipment. A further object is to provide apparatus which utilizes directly the temperature of the gas medium used in the test rather than indirect means of temperature determination.

It is an object of the invention to provide a novel apparatus for calibrating a positive displacement gas meter wherein the absolute temperature difference between the gas at the source and at the meter is determined thereby eliminating dependence upon temperature equilibrium of the source and the meter.

It is an object of the invention to provide meter calibration apparatus including a source of a known volume of gas, means for connecting the source to the meter under test for gas flow from the source through the meter, a first temperature sensitive element and means for mounting the element in the source outlet and thermally isolated therefrom, a second temperature sensitive element and means for mounting the second element in the meter outlet and thermally isolated therefrom, and means for determining the difference in temperatures indicated by the elements. A further object is to provide such apparatus which may be used with various types of sources, such as single volume sources and continuous flow sources.

It is an object of the invention to provide gas meter calibration apparatus that produces a temperature correction indication that may be used directly in the calibration calculation. A further object is to provide calibration apparatus in which the temperature correction and the volume error are automatically combined to provide a corrected volume error output. Another object is to provide such apparatus that may use either digital or analog components or combinations thereof.

It is an object of the invention to provide gas meter calibration apparatus with which calibrations can be made at several flow rates. A further object is to provide such apparatus wherein calibrations can be automatically performed at several flow rates.

It is an object of the invention to provide calibration apparatus using temperature sensitive elements such as large temperature coefficient resistances for determining the gas temperature at the source and meter outlets. A further object is to provide new and improved mounts for temperature sensitive elements in gas flow lines providing suitable thermal isolation from the equipment.

The invention also comprises novel details of construction and novel combinations and arrangements of parts, which will more fully appear in the course of the following description. The drawing merely shows and the description merely describes preferred embodiments of the present invention which are given by way of illustration of example:

In the drawing:

FIG. 1 is a view of a preferred form of the invention;

FIG. 2 is an enlarged sectional view of a temperature sensitive element installation;

FIG. 3 is a sectional view taken along the line 3—3 of FIG. 2;

FIG. 4 is a circuit diagram of the instrument of FIG. 1; and

FIG. 5 is a schematic diagram of another form of the invention.

The apparatus shown in FIG. 1 includes a gas source, such as a prover 10, and a gas meter 11, with the prover coupled to the meter by a conduit or hose 12. The prover 10 is of conventional construction and includes a base 15 in the form of an annular tank open at the top and filled with a liquid such as oil. A cylindrical bell 16 closed at the top and open at the bottom is moved up and down in the tank of the base 15 by means of a pulley 17 and weight 18. A U-shaped conduit 19 provides communication between the interior of the bell 16 and the exterior of the prover. Valves 20, 21 positioned at the outer end of the conduit 19 provide flow control therethrough.

In operating the prover, the valve 20 is opened with the bell 16 in a lowered position, after which the bell is raised drawing a volume of air into the bell. The valve 20 is now closed and the valve 21 opened so that as the bell is lowered, the air is forced out of the prover and through the conduit 12 and the meter 11 via the meter inlet 24 and outlet 25. A scale 26 fixed to the bell 16 and a pointer 27 fixed to the tank 15 provide a measure of the movement of the bell and hence a measure of the volume of air drawn into or moved out of the prover. Conventional provers are ordinarily designed to provide a constant pressure in the bell so as to produce a substantially constant rate of flow of gas through the meter. The rate of flow may also be controlled by positioning a throttling valve at the outlet 25 of the meter. Such a throttling valve may be made adjustable to provide calibration at several different rates of flow. A thermometer 28 fixed to the frame of the prover measures the air temperature and another thermometer 29 is partially immersed in the oil to measure the oil temperature.

In conventional calibration procedures, the prover and hence the gas leaving the prover is presumed to be at room temperature when the readings of the thermometers 28, 29 differ by no more than one or two degrees. When the meter has been soaking in the room for several hours, it is also presumed to be at room temperature, after which a known volume of gas is passed from the prover through the meter and the meter indication appearing at the conventional dials 32 is compared with the prover indication at the scale 26 to determine the volume error of the meter.

In the apparatus of the invention, a temperature sensitive element 33 is positioned in the conduit 19 adjacent the bell 16 so that the gas leaving the bell will pass by the element. A similar temperature sensitive element 34 is positioned at the outlet 25 of the meter so that the gas leaving the meter will pass thereby. Typical temperature sensitive elements include thermistors, thermocouples and lengths of resistance wire having relatively large temperature coefficient. While the particular temperature coefficient of the temperature sensitive element is not significant, the sensitivity of the element will be a function of its temperature coefficient and the phrase "large temperature coefficient" is used to contrast the element of the invention with resistors and the like having zero or substantially zero temperature coefficient.

A preferred form of the temperature sensing elements is shown in FIGS. 2 and 3 and includes a sleeve 35 with another sleeve 36 fixed therein. The sleeve 36 is designed to slide directly into the outlet of a typical gas meter with the end 37 of the sleeve 35 serving as a stop so that the element may quickly and easily be placed on and removed from a meter, conduit or fitting. A length of resistance wire is wound on a base 38 which in turn is fixed within an opening 39 of a plate 40 by suitable means such as by cement. The plate 40 is selected of a material having very low thermal conductivity, such as cardboard or the like, and may be a press fit in the sleeve 36 or may be cemented in place. The sleeve 36 may also be made of cardboard or the like to have low thermal conductivity. Suitable leads 44 for connecting the temperature sensitive element into a circuit pass through a plug 45 in the wall of the sleeve 35.

The element 33 is installed within the prover and need only be removed for calibrating the instrument. The element 34 is adapted for ready mounting on and removal from meters being tested.

The temperature sensitive element itself, here the resistance wire on the insulating base 38, is selected to have high heat conductivity, a large surface area per unit of mass, and low heat mass so that the element will respond very rapidly to temperature change. The element is positioned in the gas flow path so as to be completely immersed in the gas stream. The element is also thermally isolated from the pipe lines, the meter and the rest of the apparatus so as to be substantially independent of temperature changes in such equipment.

In installations where the area of the gas flow path is large in comparison to the area of the temperature sensitive element, as when a bead thermistor is used, a means of increasing the heat sensing area may be provided. The sensitive element may be mounted on a plate or block having high thermal conductivity, a large surface area and a small heat mass. A thin plate of copper or aluminum would be suitable. This plate may be mounted in the same manner as the bore 38 so that the plate temperature and hence the temperature of the sensitive element will respond rapidly to changes in gas temperature.

The temperature sensitive elements 33, 34 provide indications of the temperature of the gas as it leaves the prover and as it leaves the meter, respectively. A preferred means for determining the difference in temperatures indicated by the elements is shown in the circuit of FIG. 4 wherein resistor 46 corresponds to the element 33 and resistor 47 corresponds to the element 34. The resistors 46, 47 and connected in a bridge circuit with standard resistors 48, 49 and a balancing potentiometer 50. A voltage source 51 is connected across the bridge through a switch 52 and a rheostat 53. A meter 54 is connected in the bridge to provide an indication of bridge balance and unbalance. A parallel-connected resistor 55 and switch 56 are connected in series with a resistor 47.

The circuit of FIG. 4 is balanced with the resistors 46, 47 at the same temperature, such as with the resistors immersed in a pan of water. Switches 52 and 56 are closed and potentiometer 50 is adjusted to provide a zero indication at the meter 54. Then with the switch 56 open, the rheostat 53 is adjusted to produce a particular indication at the meter 54 so that the meter will indicate directly temperature difference in degrees or temperature difference in percent of one temperature reading or the other, or in any other desired manner.

In operating the apparatus of the invention, the conduit 12 is fixed to the inlet of the meter to be tested and the element 34 is fixed in the outlet. A quantity of air is drawn into the prover through the valve 20 and is then moved outward through the valve 21 and through the meter. After a portion of the gas has been moved from the prover through the meter, usually about one-half of the total volume, the switch 52 is closed and the temperature meter 54 indication is noted. At the end of the test, the volume indication of the meter is compared with the measured volume from the prover to provide a volume error for the meter. This volume error is then corrected with the temperature differential indicated to provide a corrected volume error. With the apparatus of the invention, there is no requirement that the prover and/or the meter be at room temperature nor that the room temperature be maintained substantially constant. The apparatus of the invention determines the temperature of the gas at the same time its volume is measured in the prover and again determines the temperature of the gas at the same time its volume is measured in the meter. Hence, the apparatus provides a positive and direct temperature correction and eliminates all errors due to assumptions of temperature equilibrium.

In a typical embodiment of the calibration apparatus, the bridge circuit of FIG. 4 is calibrated to read the temperature correction $T_c$ directly, i.e., the meter 54 indicates $$T_c = \frac{535}{535 - (T_s - T_M)} \quad (1)$$

where $T_s$ is the temperature of the gas at the source and $T_M$ is the temperature of the gas at the meter. The volume correction $V_c$ is obtained in the usual manner by comparing the indication at the source and at the meter and using the following expression $$V_c = \frac{V_s}{V_M} \quad (2)$$

where $V_s$ is the volume discharged from the source and $V_M$ is the volume indicated at the meter. The temperature correction $T_c$ obtained from the meter 54 is multiplied by the volume correction $V_c$ to obtain the temperature compensated volume correction for the gas meter under test. With the bridge circuit calibrated at about 75° F., the above procedure will be quite accurate over an ambient temperature range of 60° to 90° F. for more accurate measurements outside this temperature range, the temperature correction can be obtained by means of the following expression $$T_c = \frac{T_a}{T_a - (T_s - T_M)} \quad (3)$$

where $T_a$ is the ambient temperature expressed in degrees

R. (degrees F. plus 460), with the meter 54 calibrated to indicate ($T_s - T_M$).

A number of variations of the calibration apparatus of the invention are shown in FIG. 5. A source consisting of a pump 57 and a standard flow meter 58 is connected to the meter-to-be-tested 11 through a line 59. The meter outlet 25 is connected to exhaust through lines 60, 61, 62 with valves 63, 64 in the line 61, 62, respectively. Another valve 65 controls gas flow in the line 59. The temperature sensitive elements 33 and 34 are connected in the outlets of the flow meter 58 and the gas meter 11 respectively. The element 33 is connected to a temperature correction unit 69 by a cable 70 and the element 34 is connected to the unit 69 by a cable 71.

A transducer 72 for converting the volume indication of the standard flow meter 58 to an electrical signal is mounted on the flow meter and is connected to the volume correction unit 73 by a cable 74. A similar transducer 75 is mounted on the meter-under-test 11 and is connected to the unit 73 by cable 76. The outputs of the temperature correction unit 69 and the volume correction unit 73 may be combined at a summing point 77 and used as an input to a recorder 78.

A sequence unit 80 is coupled to the valves 63, 64, 65 and the units 69, 73 for actuating these elements in a predetermined sequence. Typically, the sequence unit may comprise a plurality of relays engaged from a motor-driven commutator. The apparatus of FIG. 5 may be operated as follows. With the meter 11 connected as shown in FIG. 5, and with the valves 63, 64 and 65 closed, the start switch of the sequence unit is actuated. The valve 65 is opened, permitting gas to flow through the standard flow meter and the meter under test at a rate determined by the exhaust line 60. After a period of time, the sequence unit energizes the correction unit 69 to provide a temperature correction output and energizes the unit 73 to provide a volume correction output. Next the valve 63 is opened to provide calibration at a different rate of flow. After a period of time at the new rate of flow, the correction units are again energized to provide outputs at this new rate. Then the procedure is repeated with the valve 64 also open. Measurements at any desired number of rates of flow may be carried out. Ordinarily, no more than three different rates of flow are used in calibrating gas meters.

In a simplified version of the apparatus of FIG. 5, the indications of the temperature correction unit and the volume correction unit may be visually observed and recorded during each rate of flow. Alternatively, the outputs of the two units may be combined to provide an automatic record of the test results. The apparatus of FIG. 5 may be analog or digital in nature or may be a combination of both. In a simple analog system, the temperature correction unit 69 will be identical to the bridge circuit of FIG. 4 and the volume correction unit may be a difference amplifier having outputs from the transducers 72, 75 as the inputs thereto. The voltage outputs of the two units are then combined at the summing point 77 to provide a single correction factor for recording. In a digital system, the temperature correction unit may comprise a bridge circuit of FIG. 4 plus an analog-to-digital converter to produce a digital output corresponding to the temperature correction. The transducers 72, 75 may be conventional digital signal generators such as position encoders, notched discs with magnetic, electric or photocell pickups, or the like. The digital outputs of the units 69, 73 may be recorded directly or they may be combined in a digital comparator to provide a single recorder output for the particular meter under test.

Although exemplary embodiments of the invention have been disclosed and discussed, it will be understood that other applications of the invention are possible and that the embodiments disclosed can be subjected to various changes, modifications and substitutions without necessarily departing from the spirit of the invention.

I claim as my invention:

1. In an apparatus for calibrating a positive displacement gas meter having an inlet and an outlet, the combination of: a source of a known volume of gas, said source having an outlet; a conduit for connecting said source outlet to said meter inlet to provide a gas flow path from said source through said meter; a first temperature sensitive element; means for mounting said first element in said source outlet and thermally isolated from said source and said conduit, said first element providing an indication of the temperature of the gas leaving said source; a second temperature sensitive element; means for mounting said second element in said meter outlet and thermally isolated therefrom, said second element providing an indication of the temperature of the gas leaving said meter; and means for determining the difference in temperatures indicated by said elements.

2. In an apparatus for calibrating a positive displacement gas meter having an inlet and an outlet, the combination of: a source of a known volume of gas, said source having an outlet; a conduit for connecting said source outlet to said meter inlet to provide a gas flow path from said source through said meter; a first temperature sensitive impedance element; means for mounting said first impedance element in said source outlet and thermally isolated from said source and said conduit, with the impedance of said first element varying as a function of the temperature of the gas leaving said source; a second temperature sensitive impedance element; means for mounting said second impedance element in said meter outlet and thermally isolated therefrom, with the impedance of said second element varying as a function of the temperature of the gas leaving said meter; and a bridge circuit having said elements connected in two arms thereof, with a power source across two opposing corners and with the voltage difference at the other two corners providing a correction factor for the indicated gas flow of said meter.

3. In an apparatus for calibrating a positive displacement gas meter having an inlet and an outlet, the combination of: a source of a known volume of gas, said source having an outlet; a conduit for connecting said source outlet to said meter inlet to provide a gas flow path from said source through said meter; a first resistance element having a relatively large temperature coefficient; means for mounting said first resistance element in said source outlet and thermally insulated from said source and said conduit; a second resistance element having a relatively large temperature coefficient; means for mounting said second resistance element in said meter outlet and thermally insulated therefrom; and a bridge circuit having said resistance elements connected in two arms thereof, with the bridge output being a function of the temperature difference of the gas as it leaves said source and as it leaves said meter.

4. In an apparatus for calibrating a positive displacement gas meter having an inlet and an outlet, the combination of: a source of a known volume of gas, said source having an outlet; a conduit for connecting said source outlet to said meter inlet to provide a gas flow path from said source through said meter; means for maintaining gas flow along said flow path at a substantially constant rate; a first plate of low thermal conductivity mounted in said source outlet with the plane of the plate parallel to the flow path; a first temperature sensitive resistor carried on said first plate, said first resistor providing an indication of the temperature of the gas leaving said source; a second plate of low thermal conductivity mounted in said meter outlet with the plane of the plate parallel to the flow path; a second temperature sensitive resistor carried on said second plate, said second resistor providing an indication of the temperature of the gas leaving said meter; and means for determining the difference in temperatures indicated by said resistors.

5. In an apparatus for calibrating a positive displacement gas meter having an inlet and an outlet, the combination of: a source of a known volume of gas, said source having an outlet; a conduit for connecting said source outlet to said meter inlet to provide a gas flow path from said source through said meter; a first temperature sensitive element; means for mounting said first element in said source outlet and thermally isolated from said source and said conduit, said first element providing an indication of the temperature of the gas leaving said source; a second temperature sensitive element; means for mounting said second element in said meter outlet and thermally isolated therefrom, said second element providing an indication of the temperature of the gas leaving said meter; means for producing a first volume signal corresponding to the volume output of said source; means for producing a second volume signal corresponding to the indicated volume passing through said meter; means for comparing said volume signals and producing a volume error signal; and means for determining the difference in temperatures indicated by said elements and producing a temperature correction signal.

6. In an apparatus for calibrating a positive displacement gas meter having an inlet and an outlet, the combination of: a source of a known volume of gas, said source having an outlet; a conduit for connecting said source outlet to said meter inlet to provide a gas flow path from said source through said meter; a first temperature sensitive element; means for mounting said first element in said source outlet and thermally isolated from said source and said conduit, said first element providing an indication of the temperature of the gas leaving said source; a second temperature sensitive element; means for mounting said second element in said meter outlet and thermally isolated therefrom, said second element providing an indication of the temperature of the gas leaving said meter; means for producing a first volume signal corresponding to the volume output of said source; means for producing a second volume signal corresponding to the indicated volume passing through said meter; a first circuit for comparing said volume signals and producing a volume error signal; a second circuit for determining the difference in temperatures indicated by said elements and producing a temperature correction signal; and means for combining said volume error signal and said temperature correction signal to produce a corrected volume error signal.

7. In an apparatus for calibrating a positive displacement gas meter having an inlet and an outlet, the combination of: a source of a known volume of gas, said source having an outlet; a conduit for connecting said source outlet to said meter inlet to provide a gas flow path from said source through said meter; means for maintaining gas flow along said flow path at a substantially constant flow rate; means for changing said flow rate to a different value; a first temperature sensitive element; means for mounting said first element in said source outlet and thermally isolated from said source and said conduit, said first element providing an indication of the temperature of the gas leaving said source; a second temperature sensitive element; means for mounting said second element in said meter outlet and thermally isolated therefrom, said second element providing an indication of the temperature of the gas leaving said meter; and means for determining the difference in temperatures indicated by said elements for each of said flow rates.

No references cited.